United States Patent [19]
Carlisle et al.

[11] Patent Number: 6,017,153
[45] Date of Patent: Jan. 25, 2000

[54] OPTICAL FIBER CONNECTOR WITH AUXILIARY SPRING

[75] Inventors: Arthur Wallace Carlisle, Dunwoody; Jeffrey Harrison Hicks, Lilburn; John Louis Siereveld, Marietta, all of Ga.

[73] Assignee: Lucent Technologies, Inc., Murray Hill, N.J.

[21] Appl. No.: 09/086,731

[22] Filed: May 29, 1998

[51] Int. Cl.[7] .................................................... G02B 6/38
[52] U.S. Cl. .............................. 385/56; 385/60; 385/86; 385/68; 385/78
[58] Field of Search .................................. 385/56, 86, 68, 385/95, 59, 55, 76, 77, 78, 60, 139

[56] References Cited

U.S. PATENT DOCUMENTS

| | | | |
|---|---|---|---|
| 4,934,785 | 6/1990 | Mathis et al. ........................ | 350/96.21 |
| 4,979,792 | 12/1990 | Weber et al. ............................. | 385/86 |
| 5,481,634 | 1/1996 | Anderson et al. ........................ | 385/76 |
| 5,719,977 | 2/1998 | Lampert et al. .......................... | 385/60 |
| 5,923,805 | 7/1999 | Anderson et al. ........................ | 385/86 |

*Primary Examiner*—Phan T. H. Palmer

[57] ABSTRACT

An optical fiber connector assembly has a connector having a bore having a cable receiving end and a reentrant interface and forming a fiber holder. A latching arm has latch means for engaging a shoulder in a adapter, and camming lobes on the latching arm engage sloping ramps in the adapter to impart a bias force to move the connector toward the interface end. A bias force augmenting member is included for insuring reliable connections over extended periods of time. The augmenting member is a resilient member whose elastic force is added to the biasing force produced by the camming lobes.

16 Claims, 5 Drawing Sheets

OPTICAL FIBER CONNECTOR WITH AUXILIARY SPRING

REFERENCE TO RELATED APPLICATIONS

This application is related to U.S. patent application Ser. No. 09/019,242 of A. W. Carlisle et al, filed Feb. 5, 1998, the disclosure of which is incorporated herein by reference.

FIELD OF THE INVENTION

This invention relates to optical fiber connectors primarily for use with, although not restricted to, plastic optical fiber (POF), and which have cable anchoring means therein.

BACKGROUND OF THE INVENTION

Present day telecommunications technology utilizes, to an increasing extent, optical fibers for signal transmission. The use of optical fibers, in turn, requires numerous collateral components especially adapted to handle the light or optical transmission, among which are optical fiber connectors, which are essential to virtually all optical fiber systems. Connectors may be used to join segments of fibers together to create longer lengths; to connect a fiber or fibers to active devices forming part of the communication system such as radiation sources, detectors, amplifiers, repeaters, or the like; or to connect the fibers to various types of passive devices such as switches, dividers, or attenuators. It is highly desirable, if not necessary, that the connectors perform their function with a minimum of signal loss, and that the making of a connection be as simple and as quickly accomplished as possible. The central function of an optical fiber connector or connectors, which most often are in butting relationship, is the positioning and maintenance of two optical fiber ends so that their central cores are aligned and in contact with each other, thus insuring maximum transfer of optical signals from one fiber to the other. Achieving this desideratum is a particularly challenging task inasmuch as the light carrying region (the core) of an optical fiber is quite small, being on the order of eight microns (8 $\mu$m) diameter for single mode fiber. Another function of an optical fiber connector is to provide mechanical stability and protection of the actual connection in the working environment. Achieving maximum signal transfer (minimum insertion loss) is a function of the alignment of the fiber cores, the width of the gap between the fiber ends, and the surface condition of the fiber end faces. Stability and junction protection are generally functions of the connector design including the material used. For example, a connector generally includes a glass or ceramic cylinder which contains the fiber to the connected, and the end face of which is designed to butt against the end face of a similar cylinder in the mating connector. Such a cylinder is commonly, called a ferrule, and it not only functions to align the core of the fiber, but, also, its end face is sufficiently smooth and flat to insure a uniform butting against the end face of the mating ferrule and, hence, a uniform butting of the fiber end faces.

There are, at present, many different types of connectors in use, all of which are aimed at achieving low insertion loss within the connection, and stability. One such connector is shown in U.S. Pat. No. 4,934,785 of Mathis et al., and comprises a cylindrical ferrule, a base member which holds the ferrule, a compression spring, and a housing surrounding the ferrule and the spring. The ferrule is held rigidly in the housing by suitable adhesive, and the compression spring applies an axial force to the ferrule and housing so that the end face of the ferrule is maintained in contact with the mating ferrule of the second connector. Although such a connector performs its functions well, it has a high parts count assembled in a relatively complex arrangement. A high parts count means a more expensive connector, and, further, the risk of lost parts during assembly, especially in the field. With the increasing use of optical fibers as the transmission media of choice, there is a need for high density interconnect arrangements, hence expensive connectors with a high parts count unduly increase the cost of such interconnection arrangements.

Another type of connector is shown in U.S. Pat. No. 5,481,634 of Anderson et al. and comprises a cylindrical ceramic ferrule contained in a plastic base member to form the fiber holding structure. The fiber holding structure is mounted within a cylindrical housing having an opening therein through which the ferrule protrudes. A cylindrical spring surrounds the base member and interacts with an interior surface of the housing to urge the ferrule axially outward from the housing opening. The housing has a cantilever type spring latch located on one exterior side of the connector which is manually operable and which mates with a shoulder within the receptacle to lock the connector therein. While this particular type of connector lends itself readily to miniaturization, it has a fairly high part count and is, therefore, subject to the same objections as the Mathis et al. connector.

Both of the aforementioned connectors are representative of prior art types, virtually all of which use coil springs to apply the contacting force. In many connectors, the springs also compensate for over-travel. That is, when a connection is made with an LC type connector (Anderson et al.), the ferrule first seats on the optical interface of the mating ferrule (or active device). It is then necessary for the plug housing to continue to advance until the cantilever latch clears the latching shoulder on the receptacle or adapter. The spring absorbs this additional axial advance and once the latch is engaged, the spring, being compressed, continues to apply an axial force between the latch and the plug body to maintain intimate contact at the interface.

There have been connector arrangements aimed at reducing the number of parts in the connector assembly. For example, in U.S. patent application Ser. No. 08/636,451 of Lampert et al., filed Apr. 23, 1996 now U.S. Pat. 5,719,977, there is disclosed a connector having a one-piece molded plastic housing having an exterior cantilever latch. The connector has a cylindrical structure extending toward the front end of the housing which has an axial passage therein for receiving an optical fiber. The cylindrical member is rigidly held within the housing and avoids the use of a spring for applying a contacting force, and the connector is adapted to mate with a conventional connector within an adapter, with the conventional connector having a spring for applying the axial contacting force. Thus, the connector of that application has a very low part count, but relies upon the conventional mating connector to supply the necessary axial contacting force.

Glass optical fibers have, heretofore, been primarily used to bring optical signals to subscriber premises, where they are transformed into electrical signals for distribution throughout the premises. However, there has been a move toward extending the optical signals into and throughout the subscriber premises due to the development of plastic optical fiber (POF). POF has many advantages over glass optical fiber (GOF) for such use. POF is not as brittle as GOF, and does not require extremes of care in handling. POF is less expensive than GOF, thus making it attractive for local usage. Further, POF is not as demanding as glass fiber in alignment because of its larger diameter, hence, the precision ferrule is not a necessary component of the connector. On the other hand, POF has higher signal loss, not having the optical transmissivity of GOF, and hence is preferably used only in short transmission spans, such as within the subscriber premises. It is anticipated that various connections to the several type of apparatus are to be made by the subscriber or customer, hence, the connections will be facilitated by less complicated or sophisticated connectors. Such connections may be made to VCR's, television sets, camcorders, and other types of domestic equipment as well as to telephones, computers, and the like.

Desirably, therefore, an optical connector should have a low part count, reduced size, and should be readily insertable and removable from an associated receptacle without a tool or the need to grasp the opposite sides thereof which is difficult to do when a number of connections are crowded together, while insuring that positive optical contact is made with the mating connector or equipment terminal. In addition, the connector should be of such simplicity that the untrained user, i.e., customers, can readily assemble it.

In the aforementioned U.S. patent application Ser. No. 09/019,242 of A. W. Carlisle et al., there is disclosed a connector that meets the criteria set forth.

The connector of that application and its associated adapter are used for terminating an optical cable or fiber, especially POF, while insuring positive optical contact for optimum signal transmission. The connector plug of the application, in a preferred embodiment thereof, comprises a single molded plastic part having a passage extending axially therethrough. The passage has fiber holding means and a tapered portion extending from the holding means to the rear end of the plug. More particularly, a portion of the passage extending from approximately the middle of the plug toward the rear end has a portion having an enlarged diameter with internal threads, and a second tapered portion extending from the thread portion to the rear end of the plug. The diameter of the threaded portion is such that the threads grip the soft or resilient jacket. With POF, the insulating and protection jacket which surrounds the fiber is bonded to the fiber. Thus, when the jacket is screwed into the threaded portion, the fiber is mounted in the connector, and it is held firmly attached thereto.

A cantilever latch is mounted on (or integral with) the plug adjacent the front end thereof and extends upwardly and rearwardly therefrom. A cantilevered trigger member is affixed to the plug adjacent the rear end thereof and extends upwardly and forwardly of the plug and the front end of the trigger overlies the free end of the cantilever latch. On the top surface of the cantilever latch arm, approximately midway between the ends thereof is a locking tab for locking the latch, and hence the plug, in axial position against rearwardly directed axial forces. On each side of the cantilever latch arm is a radiused camming lobe, extending upwardly and positioned approximately midway between the two ends of the cantilever latch arm.

The receptacle or adapter has an opening therein and an internally extending bore shaped to receive the plug and cantilever latch. The dimensions of the bore are such that when the plug is inserted into the adapter, the cantilever latch arm is depressed until the locking tab passes a shoulder in the bore, at which point the elasticity of the arm causes the locking tab to spring upward to bear against the shoulder and secure the plug against rearward tension. On either side of the shoulder and extending therefrom in a forward direction are first and second sloped or ramped surfaces which slope upwardly toward the operative end of the adapter and against which the radiused camming lobes are adapted to bear when the plug is inserted into the adapter. The natural elasticity of the cantilever latch arm forces the lobes into contact with the ramped surfaces with a resultant downward and forward force being applied through the lobes to the plug. Thus, the lobes tend to move up the slope and the ferrule member is moved forward into contact with the mating coupler or fiber end. The resilience or elasticity of the cantilever latch arm thereby supplies the desired axial contacting force.

Because POF does not require the very precise alignment of the fiber in the connector, it is not necessary to have a precision device such as a ferrule for the fiber at the interface. Thus, the user can achieve sufficient alignment by simply screwing the jacketed fiber into the threaded portion. On the other hand, support means for the fiber end at the interface may be used if desired.

The connector assembly of the application thus has very few parts, is economical to manufacture, is as simple to operate as a standard telephone jack, and makes the use of optical fiber within the subscriber premises plausible and feasible, especially when POF is used.

The plastic cantilever latch arm and associated cam lobes in conjunction with the ramped surface of the adapter provide the needed forward axial contacting force. This contacting force is dependent upon the resilience or elasticity of the latch arm material, i.e., plastic. However, when held in a fixed stressed position, as is the case with the assembled plug and adapter, plastic springs are characterized by a gradual decrease in force with time, a phenomenon known as "creep". As long as some forward force remains creep is not a major concern such as in the case of, for example, a semipermanent connection. On the other hand, in some cases, such as, for example, those where the connection is made and unmade frequently, creep can present problems of nonrepeatability and lack of, or reduced, reliability.

SUMMARY OF THE INVENTION

The present invention is a connector of, for example, the type shown in the Carlisle et al. application, in which the elasticity or resiliency of the plastic latch arm is reinforced or augmented by a resilient or elastic member. In a preferred embodiment of the invention, the resilient or elastic member comprises a U-shaped leaf spring which is mounted on or partially in the connector body between the connector body and the cantilevered latching arm. The spring, which may be made of any of a variety of suitable materials, such as, for example, beryllium copper or phosphor bronze, fits within a holding slot in the side of the connector or plug body and extends upward from the face of the body that faces the underside of the cantilevered latch arm. The spring is held in place by molded knobs on both edges of the lower or under side of the arm and by the slot in the plug body.

The sizing of the spring is determined based upon the elasticity of both the straight and the curved section thereof, and, preferably, produces a reinforcing force of approximately one pound which adds directly to the force of the plastic latch arm. Thus, if, over a period of time, there is a tendency for "creep", the spring will maintain sufficient force on the cantilever arm to retain the proper functions thereof, i.e., supplying a forward bias to the plug. The reinforcing spring of the invention is primarily designed for use with the connector shown in the Carlisle et al application. However, in any such connector which relies upon the resiliency or elasticity of, for example, the latching arm, the reinforcing action of the spring of the invention would be useful.

The various features of the present invention will be more readily apparent from the following detailed description, read in conjunction with the accompanying drawings.

DETAILED DESCRIPTION

Figure 1:
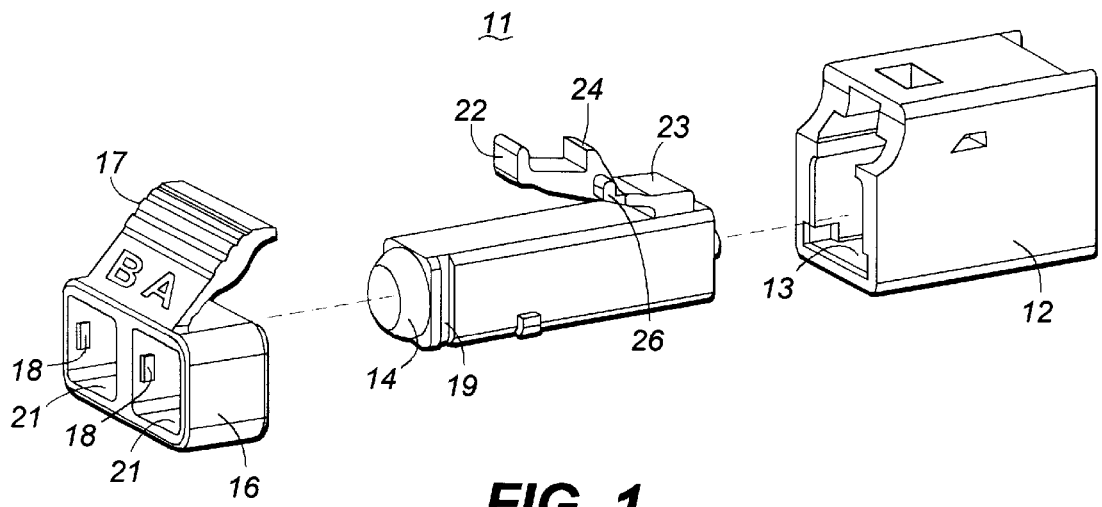
FIG. 1 is an exploded perspective view of the connector and adapter of the Carlisle et al. application.

FIG. 1 is an exploded perspective view of the connector and adapter assembly of the type shown and described in the aforementioned patent application of Carlisle et al., which is incorporated herein by reference.

Figure 2:
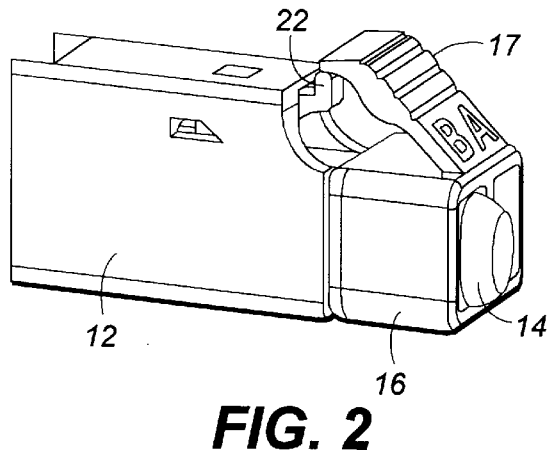
FIG. 2 is a perspective view of the assembly of FIG. 1 as assembled.

The assembly 11 of FIG. 1 comprises a receptacle or adapter member 12 having a bore 13 extending therethrough for receiving a connector member 14. A trigger holding member 16 having a cantilevered trigger 17 affixed at one end thereof is adapted to be latched to the connector 14 by latching means 18 on member 16 and grooves 19 on connector 14. Trigger holding member 16 is shown as a duplex member, i.e. having two openings 21 for receiving two connectors 14. In the top surface of arm 22, approximately midway between the distal and proximal ends thereof is a latching projection or tab 24 and, on either side thereof is a radiused camming lobe 26, only one of which is shown. As best seen in FIG. 2, the distal end of trigger arm 17 overlies the distal end of latching arm 22 for actuation thereof as described hereinbefore. The bore 13 in adapter 12 is rectangular in shape for receiving the rectangular connector 14. A better understanding of the construction and functional relationship of the connector 14 and adapter 12 may be had with reference to FIGS. 3 and 4.

Figure 3:
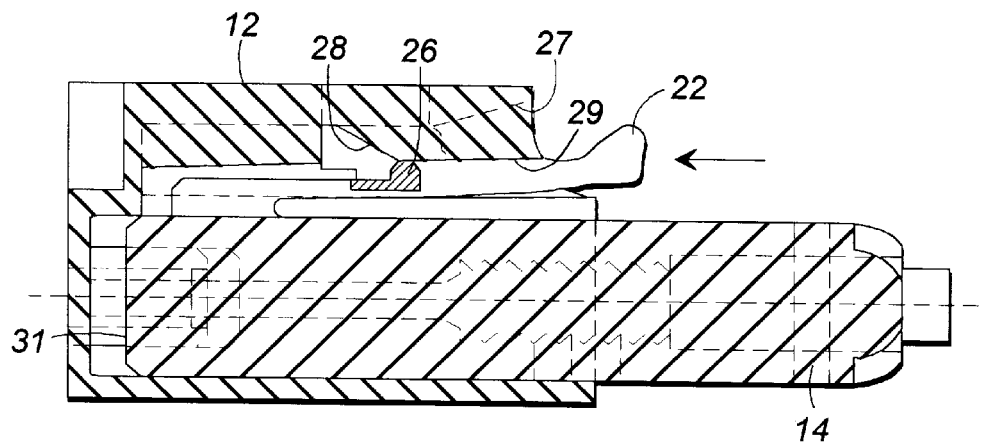
FIG. 3 is a cross-sectional elevation view of the assembly of FIG. 1.
Figure 4:
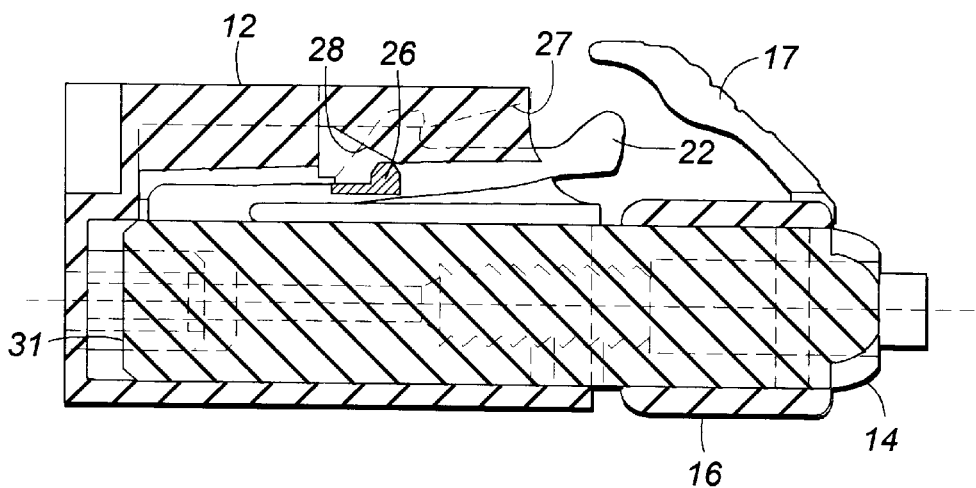
FIG. 4 is another cross-sectional elevation view of the assembly of FIG. 1.

FIGS. 3 and 4 depict the action of the camming lobes 26 during and after insertion of the connector 14 into the adapter 12. For simplicity, member 16 and trigger arm 17 have not been shown in FIG. 3, however, the depressed position of arm 22 is, initially, due to the action of trigger arm 17 thereon. As can be seen in the figures, the interior upper surface of bore 13 has a sloped portion 27 leading into adapter bore 13 which functions to force tab 24 downward as connector 14 is inserted into adapter 12 and pushed forward. A notch is formed in the camming surfaces 29 formed in the bore 13 which has a sloped camming surface 28 sloping upward from rear to front. As the connector 14 is inserted into adapter 12 and pushed forward, the camming lobes 26 ride up the slope 28, with the spring action of arm 22 maintaining them in contact with slope 28, thereby applying a forward bias to connector 14, as explained in greater detail in the aforementioned Carlisle et al. patent application, and driving butt end 31 of connector 14 forward into its butting position.

As has been discussed hereinbefore, the plastic spring arm 22 can be, over an extended period of time, subject to "creep", that is, a gradual lessening of its spring force. As a consequence, a point may be reached where the forward biasing force is no longer reliable. The present invention is directed to counteracting "creep" by an arrangement whereby the biasing force of the cantilever arm 22 is augmented by a spring member which is not subject to "creep", thereby maintaining the reliability of the connection for the life thereof.

Figure 5:
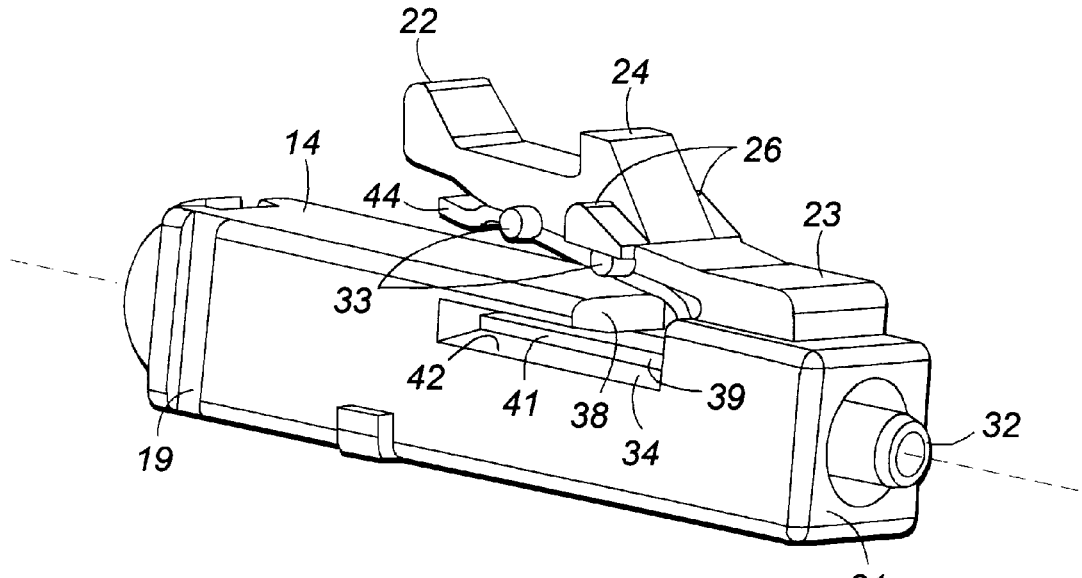
FIG. 5 is a perspective view of the connector plug of the present invention.
Figure 6:
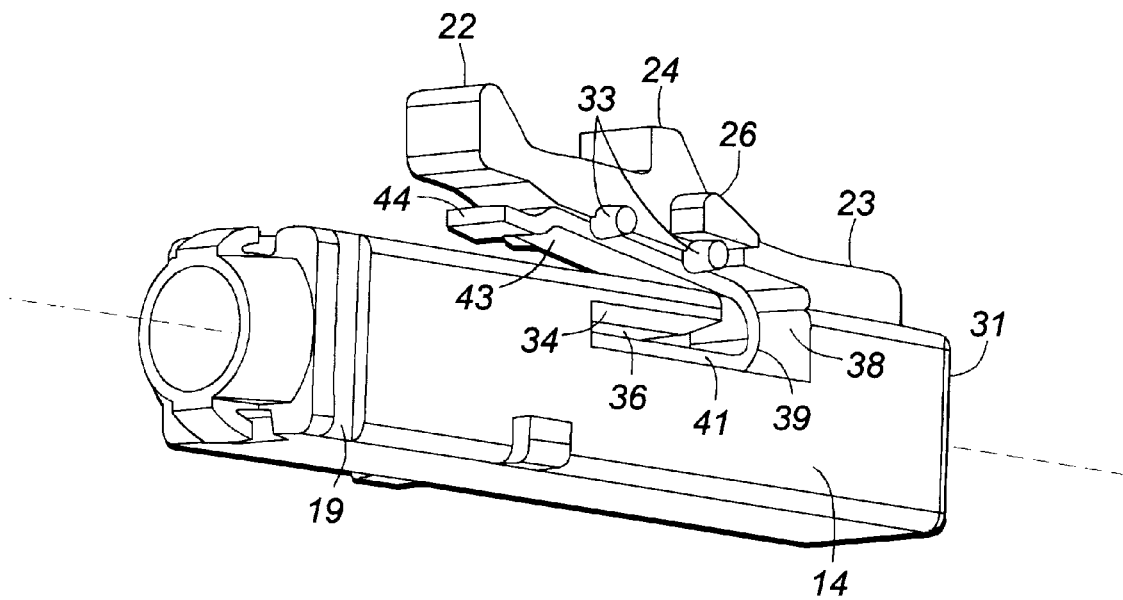
FIG. 6 is a different perspective view of the connector of the present invention.

FIGS. 5 and 6 are perspective views of the connector of the present invention. For simplicity, those parts or elements corresponding to the same elements in FIGS. 1 through 4 bear the same reference numerals.

Figure 7:
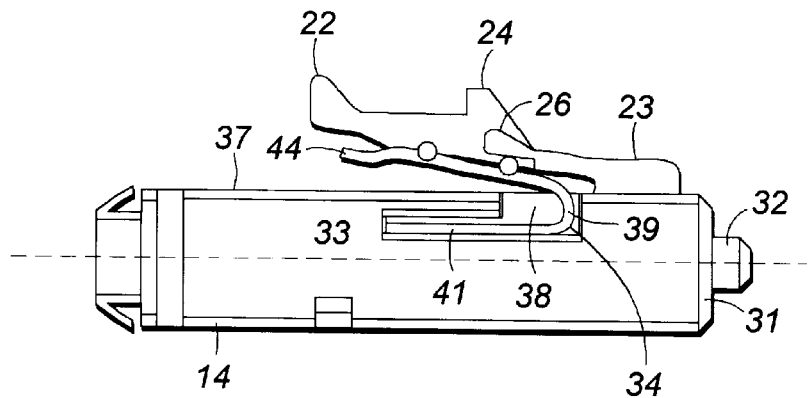
FIG. 7 is an elevation view of one side of the connector of the invention.

In FIGS. 5 and 6, the connector 14 conforms in size, shape, and general configuration to the connector 14 of and is for use with adapter 12 as shown in FIGS. 1 through 4. However, as can be seen, the latching arm 22 has formed thereon and on each side, a pair of locating knobs or lugs 33,33 which extend laterally from the underside of the arm 22. In addition, the body of connector has a slot or opening 34 in one side thereof, which extends inwardly across the body to a point beyond the centerline, where it is terminated by the side wall 36. The upper surface 37 of the connector has an opening 38 which opens to slot 34 as best seen in FIG. 7. Within slot 34 is a U-shaped spring member 39 having one leg 41 resting on and supported by the floor 42 of the slot, and the other leg 43 passing through opening 38 to bear against the underside of the arm 22 and to be held into place by the two pairs of knobs or lugs 33. The distal end of leg 43 has an offset portion 44 which facilitates compression of the spring 39 to clear knobs 33 while the spring 39 is being inserted into the connector 14. Offset 44 also functions as a stop to prevent over-compression of the spring. Spring 39, when in position as shown in FIGS. 5 and 6, applies an augmenting force to the underside of arm 22 to assist in driving ferrule 32, projecting from face 31, into engagement with a mating connector ferrule. Offset portion 44 serves the additional function of limiting the amount of compression of spring 39, and the amount of depression of arm 22.

Figure 8:
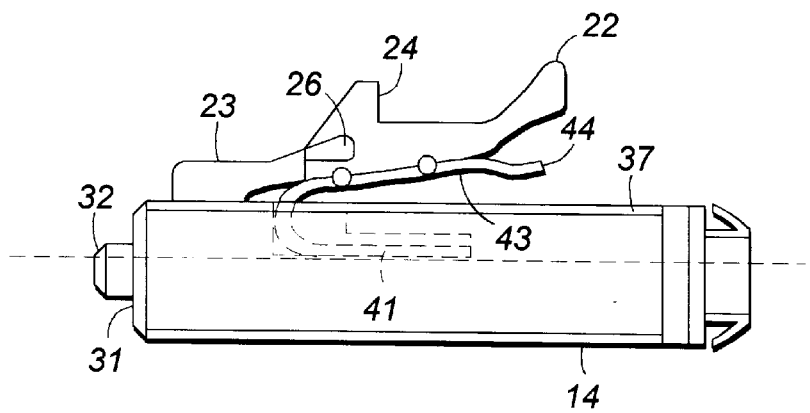
FIG. 8 is an elevation view of the other side of the connector of the invention.
Figure 9:
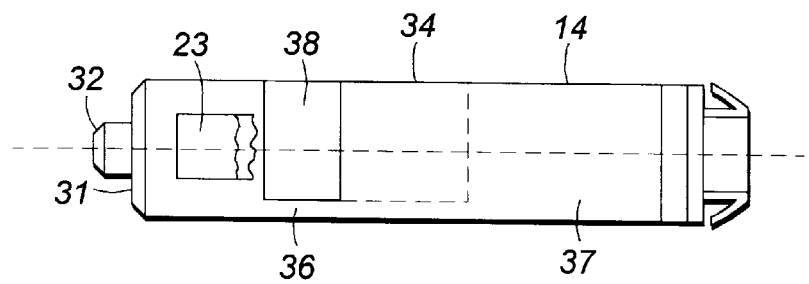
FIG. 9 is a plan view of the connector of the invention with certain parts omitted.

FIG. 7 is an elevation view of one side of the connector 14 and FIG. 8 is an elevation view of the other side of the connector, while FIG. 9 is a plan view of the top of the connector. These views serve to make clear the orientation of the slot 34 and the operative position of the spring 39, although the spring has been omitted from FIG. 9 so that slot 34, wall 36, and opening 38 may be more clearly depicted.

Figure 10:
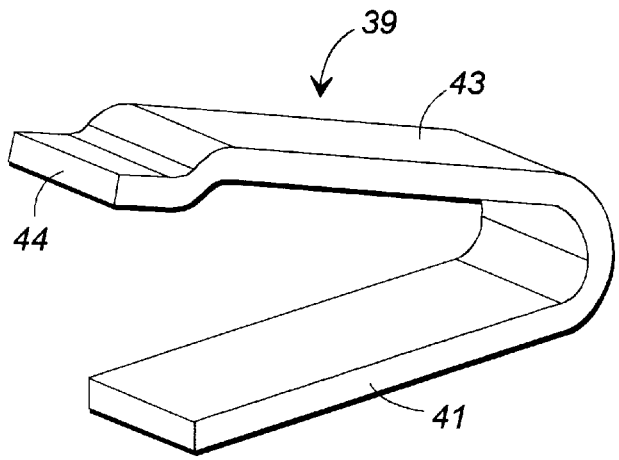
FIG. 10 is a perspective view of the resilient member of the present invention.

FIG. 10 is a perspective view of the spring 39 of the present invention. Spring 39, which may range into thickness from 0.12 to 0.15 inches can be made of any of a number of suitable materials, such as, for example, beryllium copper or phosphor bronze. The shape of the spring is such that when the upper leg 43 is depressed, it exerts an upward force that is proportional to the amount of deflection. The sizing and contour of the spring are such that in the nominal latched position, the spring exerts approximately one pound of force on the cantilever arm 22, thereby adding directly to that arm's elastic force. As a consequence, even though some "creep" might occur over a period of time, the force from the spring insures connector reliability.

Figure 11A:
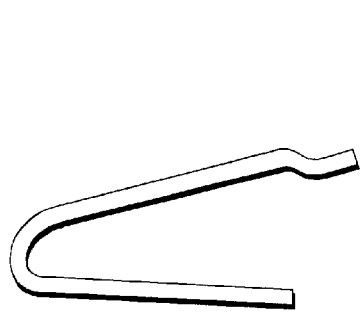
FIG. 11(a) through 11(e) are elevation views of the resilient member under different degrees of compression.
Figure 11C:
Figure 11D:
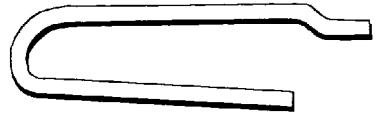
Figure 11B:
Figure 11E:
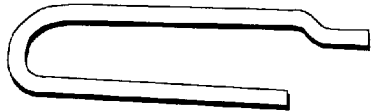

FIGS. 11(a) through 11(e) are several views of the spring 39 illustrating its compression at different stages. Thus, FIG. 11(a) shows the spring in its free, pre-load configuration, FIG. 11(b) shows its nominal, in place position, FIG. 11(c) shows the locked position; FIG. 11(d) shows the spring compressed for insertion; and FIG. 11(e) shows the maximum compression of the spring.

The assembly of the invention is substantially immune from the effects of "creep" and insures reliable connections. Although the connector assembly depicted includes the camming feature, the resilient latching arm for use in connectors without the camming feature is still subject to "creep". Thus, the spring of the present invention is useful for counter-acting such "creep". While a U-shaped spring has been depicted as a preferred embodiment, it is also possible to use other types of resilient devices, such as, for example, a coil spring, with only slight alteration to the connector. The present invention has been disclosed as it relates to optical fiber connectors. However, the principles and features of the present invention can be used in electrical connectors wherein elements of the connector structure are subject to "creep", for example.

In concluding the detailed description, it should be noted that it will be obvious to those skilled in the art that many variations and modifications may be made to the preferred embodiment without substantially departing from the principles of the present invention. All such variations and modifications are intended to be included herein with the scope of the present invention, as set forth in the following claims. Further, in the claims hereafter, the corresponding structures, materials, acts, and equivalents of all means or step plus function elements are intended to include any structure, material, or acts for performing the functions with other claimed elements as specifically claimed.

We claim:

1. A connector body for use in a connector assembly having an adapter member for receiving the connector body, said connector body comprising:
   an elongated body member having a bore extending therethrough and an interface end and a fiber entrant end, said body member having an upper portion and first and second sides;
   a resilient latching arm having a proximal end affixed to said body member and a free distal end, said latching arm extending away from said body member at an angle thereto, said latching arm further having a lower surface spaced from said upper surface of said body member;
   a reinforcing member for augmenting the elastic force of said latching arm comprising a resilient spring member mounted between said resilient latching arm and said body member.

2. A connector body as claimed in claim 1 wherein said reinforcing member is positioned to bear against said lower surface of said latching arm and against said body member.

3. A connector body as claimed in claim 2 wherein said reinforcing member is a U-shaped spring having two legs, one of said legs bearing against the lower surface of said latching arm and the other of said legs bearing against said body member.

4. A connector as claimed in claim 3 wherein said locating lugs are spaced apart a distance sufficient to locate said other leg of said U-shaped spring therebetween.

5. A connector as claimed in claim 3 wherein said body member has a slotted opening in one of said sides extending inwardly thereof and having a floor upon which one of said legs of said U-shaped spring rests;
said body member further having an opening in said upper portion which communicates with said slotted opening through which the other of said legs of said U-shaped spring projects.

6. A connector as claimed in claim 3 wherein said resilient latching arm has first and second locating lugs projecting from said lower surface thereof.

7. A connector body as claimed in claim 1 wherein said connector body is an optical fiber connector body.

8. An optical fiber connector assembly comprising, in combination:
   an optical connector comprising an elongated body having a bore extending axially therethrough;
   said body having an interface end and a fiber entrant end;
   a resilient latching arm having a proximal end affixed to said body and a free distal end for applying an elastic force to said arm;
   at least one camming lobe on said latching arm;
   said assembly further comprising an adapter member for receiving said connector, said adapter member comprising a body having an axially extending bore therethrough and an interface end and a connector receiving end;
   camming means within said adapter against which said camming lobe is adapted to bear for causing the elastic force to apply a biasing force toward said interface end of said adapter to said connector within said adapter;
   means within said adapter forming a latching shoulder for said latching arm; and
   an elastic force reinforcing member comprising a resilient spring member mounted between the resilient latching arm and the elongated connector body.

9. An optical fiber connector assembly as claimed in claim 8 wherein said latching arm has a lower surface and said reinforcing member is a U-shaped spring having two legs, one of said legs bearing against said lower surface and the other of said legs bearing against said body member.

10. An optical fiber connector assembly as claimed in claim 9 wherein said latching arm has a plurality of spaced locating members projecting from said lower surface.

11. An optical fiber connector assembly as claimed in claim 10 wherein said locating members are spaced apart a distance sufficient to locate said other leg of said U-shaped spring.

12. For use in an optical fiber connector assembly having an elongated connector body, an adapter for receiving said body, and a resilient latching arm having an elastic force for latching the connector body to the adapter, a reinforcing member for augmenting the elastic force of the latching arm comprising a resilient spring member mounted between the resilient latching arm and the elongated connector body.

13. The reinforcing member as claimed in claim 12 wherein said member comprises a U-shaped spring positioned between the resilient latching arm and the elongated connector body to apply a spring force therebetween.

14. The reinforcing member as claimed in claim 13 wherein said member is made of beryllium copper.

15. The reinforcing member as claimed in claim 13 wherein said member is made of phosphor bronze.

16. The reinforcing member as claimed in claim 13 wherein said U-shaped spring has first and second legs for bearing against the resilient latching arm and the connector body, respectively, said first leg having a distal end having an offset portion.

* * * * *